US010200431B2

(12) United States Patent
Zhou et al.

(10) Patent No.: US 10,200,431 B2
(45) Date of Patent: Feb. 5, 2019

(54) MULTIMEDIA SYSTEM AND METHOD FOR STREAMING SYNCHRONIZATION

(71) Applicant: FREESCALE SEMICONDUCTOR, INC., Austin, TX (US)

(72) Inventors: Luwei Zhou, Shanghai (CN); Zhi Li, Austin, TX (US)

(73) Assignee: NXP USA, Inc., Austin, TX (US)

( * ) Notice: Subject to any disclaimer, the term of this patent is extended or adjusted under 35 U.S.C. 154(b) by 518 days.

(21) Appl. No.: 14/946,506

(22) Filed: Nov. 19, 2015

(65) Prior Publication Data

US 2016/0352826 A1  Dec. 1, 2016

(30) Foreign Application Priority Data

May 25, 2015 (CN) .......................... 2015 1 0395090

(51) Int. Cl.
  *G06F 15/16* (2006.01)
  *H04L 29/06* (2006.01)

(52) U.S. Cl.
  CPC ................ *H04L 65/4092* (2013.01)

(58) Field of Classification Search
  CPC .......... H04N 21/4307; H04N 21/43637; H04L 29/06027; H04L 65/60; H04L 43/106
  See application file for complete search history.

(56) References Cited

U.S. PATENT DOCUMENTS

| 6,724,736 | B1* | 4/2004 | Azriel | H04B 3/23 370/286 |
| 8,102,787 | B2* | 1/2012 | Wang | H04J 3/0697 370/310 |
| 8,208,497 | B2* | 6/2012 | Rangan | H04J 3/0685 370/347 |
| 8,428,045 | B2 | 4/2013 | Gelter | |
| 8,473,638 | B2* | 6/2013 | Aweya | H04J 3/0667 709/203 |
| 8,478,856 | B2 | 7/2013 | Williams | |
| 9,178,927 | B2* | 11/2015 | Williams | H04L 47/564 |
| 9,237,324 | B2* | 1/2016 | Lee | H04L 65/605 |
| 9,684,485 | B2* | 6/2017 | Vega-Zayas | G06F 3/165 |
| 9,723,580 | B2* | 8/2017 | Boehlke | H04J 3/0664 |
| 2004/0228367 | A1* | 11/2004 | Mosig | H04L 29/06027 370/503 |
| 2005/0259754 | A1* | 11/2005 | Ho | H04N 21/4305 375/240.28 |
| 2005/0281255 | A1* | 12/2005 | Davies | H04N 21/4307 370/389 |

(Continued)

*Primary Examiner* — Shean Tokuta

(57) ABSTRACT

A multimedia system includes a source device for providing a media stream and a sink device for playing the media stream. The source device encapsulates the media stream into data packets with corresponding timestamps associated with a first wall time, and transmits the data packets to the sink device based on the timestamps and the first wall time. The sink device provides a second wall time based on the second global clock, synchronizes the second wall time with the first wall time through a network protocol, generates a local media clock, and locks the local media clock to the second global clock. The sink device decapsulates the data packets, and then plays the media stream with the locked local media clock. A play-out time of each data packet is determined by a corresponding timestamp and the second wall time.

11 Claims, 7 Drawing Sheets

(56) References Cited

U.S. PATENT DOCUMENTS

| | | | |
|---|---|---|---|
| 2006/0280182 A1* | 12/2006 | Williams | H04J 3/0632 370/394 |
| 2007/0226530 A1* | 9/2007 | Celinski | G06F 1/12 713/500 |
| 2008/0291863 A1* | 11/2008 | Agren | H04J 3/0632 370/315 |
| 2009/0261910 A1* | 10/2009 | Locker | H03L 7/18 331/34 |
| 2011/0276975 A1* | 11/2011 | Brown | G06F 3/162 718/103 |
| 2012/0176201 A1* | 7/2012 | Ganesh | H03L 7/085 331/17 |
| 2013/0003757 A1* | 1/2013 | Boatright | H04J 3/0697 370/474 |
| 2013/0003863 A1* | 1/2013 | Hutchings | H04N 21/4183 375/240.25 |
| 2014/0173136 A1* | 6/2014 | Hazelet | G06F 1/14 709/248 |
| 2015/0245306 A1* | 8/2015 | Boehlke | H04J 3/0664 370/350 |
| 2016/0080784 A1* | 3/2016 | Kuwelkar | H04L 1/00 725/75 |
| 2016/0164795 A1* | 6/2016 | Kuwelkar | H04L 65/60 370/253 |
| 2016/0302193 A1* | 10/2016 | Rabii | H04N 21/43637 |
| 2016/0352826 A1* | 12/2016 | Zhou | H04L 65/4092 |

\* cited by examiner

MULTIMEDIA SYSTEM AND METHOD FOR STREAMING SYNCHRONIZATION

BACKGROUND

The present invention relates generally to multimedia systems and, more particularly, to a method for multimedia streaming synchronization.

FIG. 1 shows a conventional multimedia system 100 including a first source device 102 for providing multimedia streams, and first and second sink devices 104 and 106 that communicate with the first source device 102 for playing the multimedia streams. In operation, the first source device 102 encapsulates the multimedia streams into data packets with corresponding timestamps associated with a first local media clock generated by a first local media clock generator 108. The first source device 102 then transmits the data packets to the first and second sink devices 104 and 106 based on the first local media clock and the timestamps. The first sink device 104 receives the data packets, decapsulates them into the multimedia streams, and plays the multimedia streams based on a second local media clock generated by a second local media clock generator 110 and the corresponding timestamps. The second sink device 106 operates in the same way as the first sink device 104 but based on a third local media clock generated by a third local media clock generator 112.

The first, second, and third local media clocks ideally are expected to have the same frequency, which is determined by a sample rate of the media streams, e.g., 48 KHZ. However, due to hardware drift of different local media clock generators, the first, second, and third local clocks may run faster or slower than each other, which results in an asynchronous problem among the source and sink devices 102, 104 and 106. It is therefore desirable to find a method to synchronize the different source and sink devices to each other.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
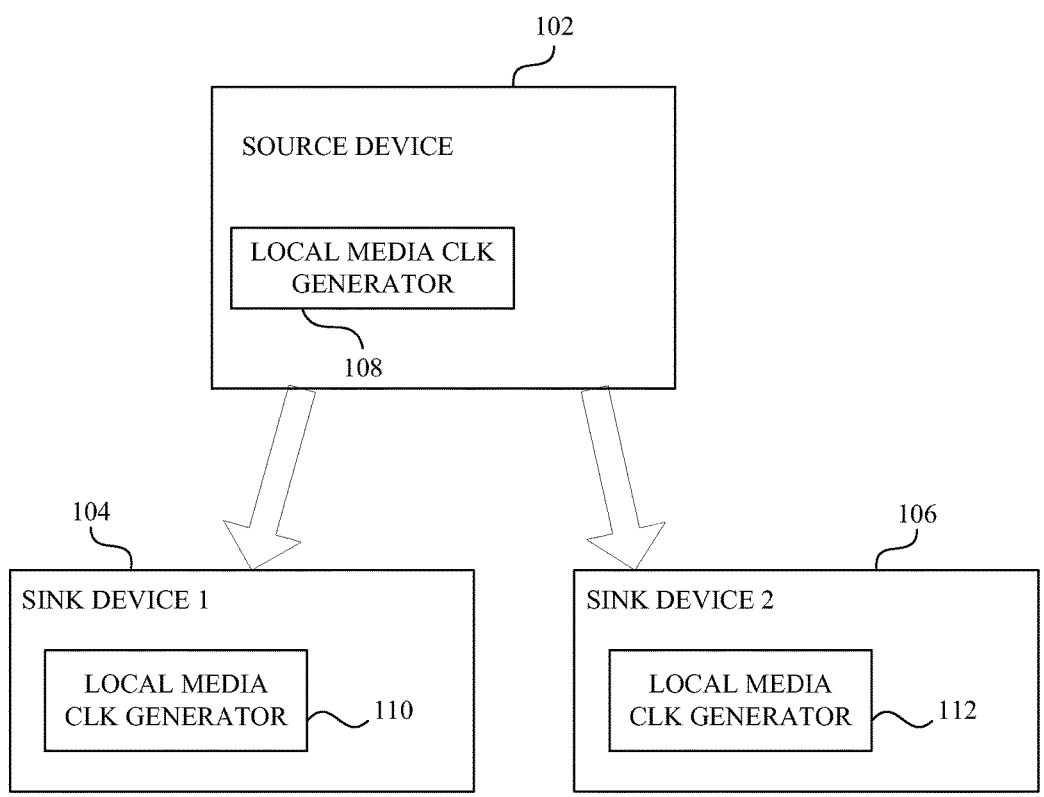
FIG. 1 is a schematic block diagram of a conventional multimedia system.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a multimedia system including at least one source device for providing at least one media stream and at least one sink device that communicates with the source device for playing the media stream.

The source device includes a memory for storing the at least one media stream, a first global clock unit for generating a first global clock and providing a first wall time based on the first global clock, a processor connected to the memory and the first global clock unit for encapsulating the media stream into a plurality of data packets with corresponding timestamps associated with the first wall time, and a first I/O interface connected to the first global clock unit and the processor for transmitting the data packets based on the timestamps and the first wall time.

The sink device includes a second I/O interface for receiving the plurality of data packets, and a second global clock unit connected to the second I/O interface for generating a second global clock and providing a second wall time. The first and second wall time are synchronized with each other through a network protocol. A local media clock generator provides a local media clock that is locked to the second global clock. A player is connected to the second I/O interface and the local media clock generator for decapsulating the data packets, and playing the at least one media stream with the local media clock, where a play-out time of each data packet is determined by the timestamps and the second wall time.

In another embodiment, the present invention provides a method of operating a multimedia system that includes source device for providing a media stream, and at least one sink device that communicates with the one source device for playing the media stream. The method includes encapsulating the media stream stored in the source device into a plurality of data packets with corresponding timestamps associated with a first wall time that is based on a first global clock in the source device, transmitting the data packets to the sink device based on the timestamps and the first wall time, synchronizing a second wall time in the sink device with the first wall time through a network protocol, wherein the second wall time is based on a second global clock in the at least one sink device, locking a local media clock in the sink device to the second global clock, decapsulating the data packets received in the sink device, and playing the media stream based on the local media clock that is locked to the second global clock, wherein a play-out time of each data packet is determined by the timestamps and the second wall time.

Figure 2:
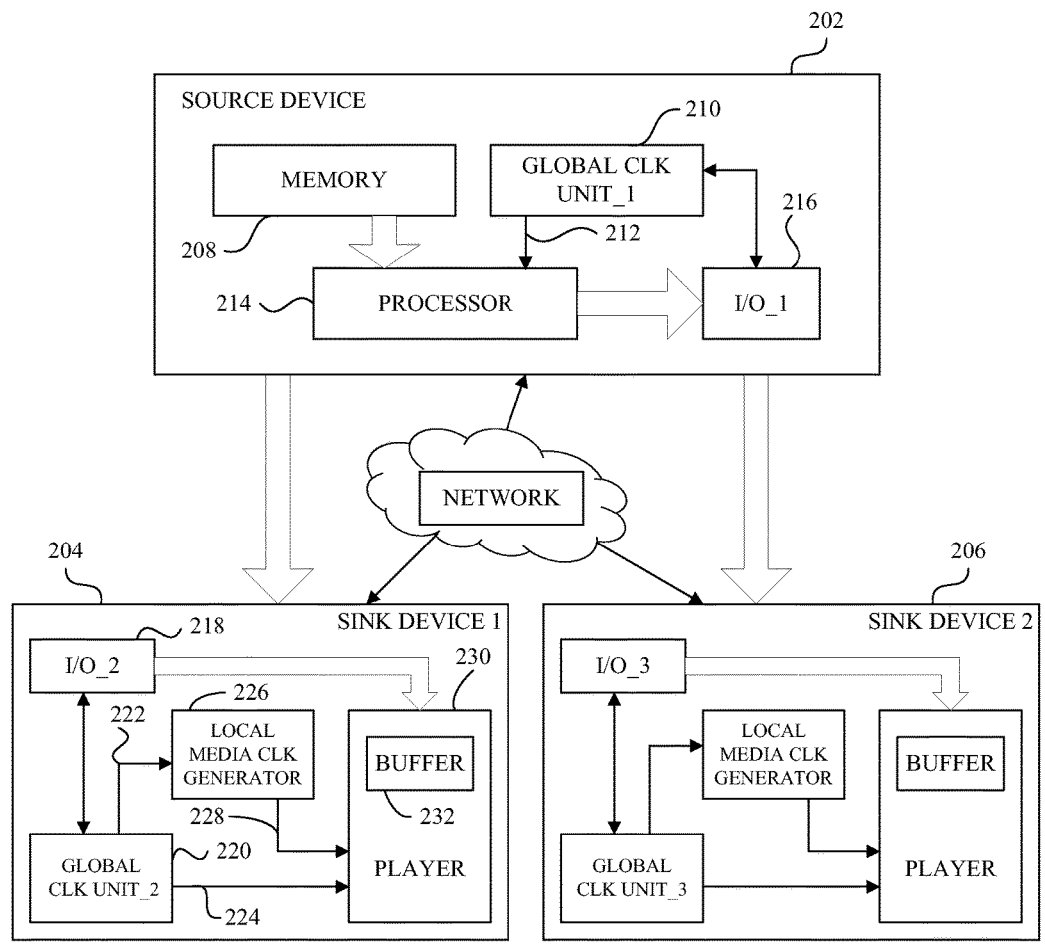
FIG. 2 is a schematic block diagram of a multimedia system in accordance with an embodiment of the invention.

Referring now to FIG. 2, a schematic block diagram of a multimedia system 200 in accordance with an embodiment of the invention is shown. The multimedia system 200 includes at least one source device 202 for providing at least one media stream, and at least a first sink device 204 communicating with the source device 202 for playing the media stream.

The multimedia system 200 can be, for example, a part of an automobile infotainment system in which the source device 202 can be a Compact Disc (CD) player, a Digital Video Disc (DVD) player, a MP3 player, etc., and the first sink device 202 can be a display located in the center console. As shown in FIG. 2, the multimedia system 200 may also include a second sink device 206 communicating with the source device 202, e.g., a display located in the back of a headrest or mounted in the ceiling. In addition, the multimedia system 200 may include more than one source devices (not shown) communicating with the first and second sink devices 204 and 206 simultaneously, e.g., an entertainment device and a monitor device, e.g. a front view camera or a rear view camera.

The source device 202 includes a memory 208 for storing the at least one media stream. The memory 208 can be a RAM or part of an internal memory (RAM) of a micro-control unit (MCU) of the source device 202. The source device 202 also includes a first global clock unit 210 for generating a first global clock and providing a first wall time 212 based on the first global clock, a processor 214 connected to the memory 208 and the first global clock unit 210 for encapsulating the media stream into a plurality of data packets with corresponding timestamps associated with the first wall time 212. The source device 202 further includes a first I/O interface 216 connected to the processor 214 and the first global clock unit 210 for communicating with the sink device 204. The first I/O interface 216 may facilitate multiple communications within a wide variety of networks and protocol types, including wired networks, for example, LAN, cable, etc., and wireless networks, such as WLAN, cellular, satellite, Bluetooth, near field communication (NFC), etc.

The first sink device 204 includes a second I/O interface 218 for communicating with the source device 202, a second global clock unit 220 connected to the second I/O interface 218 for generating a second global clock 222 and providing a second wall time 224 based on the second global clock 222, a local media clock generator 226 connected to the second global clock unit 220 for generating a local media clock 228 associated with the sample rate of the multimedia stream, and a player 230 connected to the second I/O interface 218, the local media clock generator 226 for decapsulating the plurality of data packets received from the source device 202 through the second I/O interface 218, and playing out the at least one media stream based on the local media clock 228.

The first wall time 212 is synchronized with the second wall time 224 through a network protocol to achieve synchronization between the source device 202 and the first sink device 204. In a preferred embodiment the first and second global clock units 210 and 220 include a master clock unit and a slave clock unit, where the slave clock unit is synchronized to the master clock unit through the network protocol. In a preferred embodiment, for a multimedia system has more than one source device or more than one sink device, the global clock unit of one of the source and sink devices is a master global clock unit, and the global clock units of other source and sink devices in the multimedia system are slave clock units, where the slave clock units are synchronized to the master clock unit through the network protocol. In a preferred embodiment, the network protocol is IEEE 1588 Precision Clock Synchronization Protocol or IEEE 802.1AS Timing and Synchronization Protocol.

Figure 3:
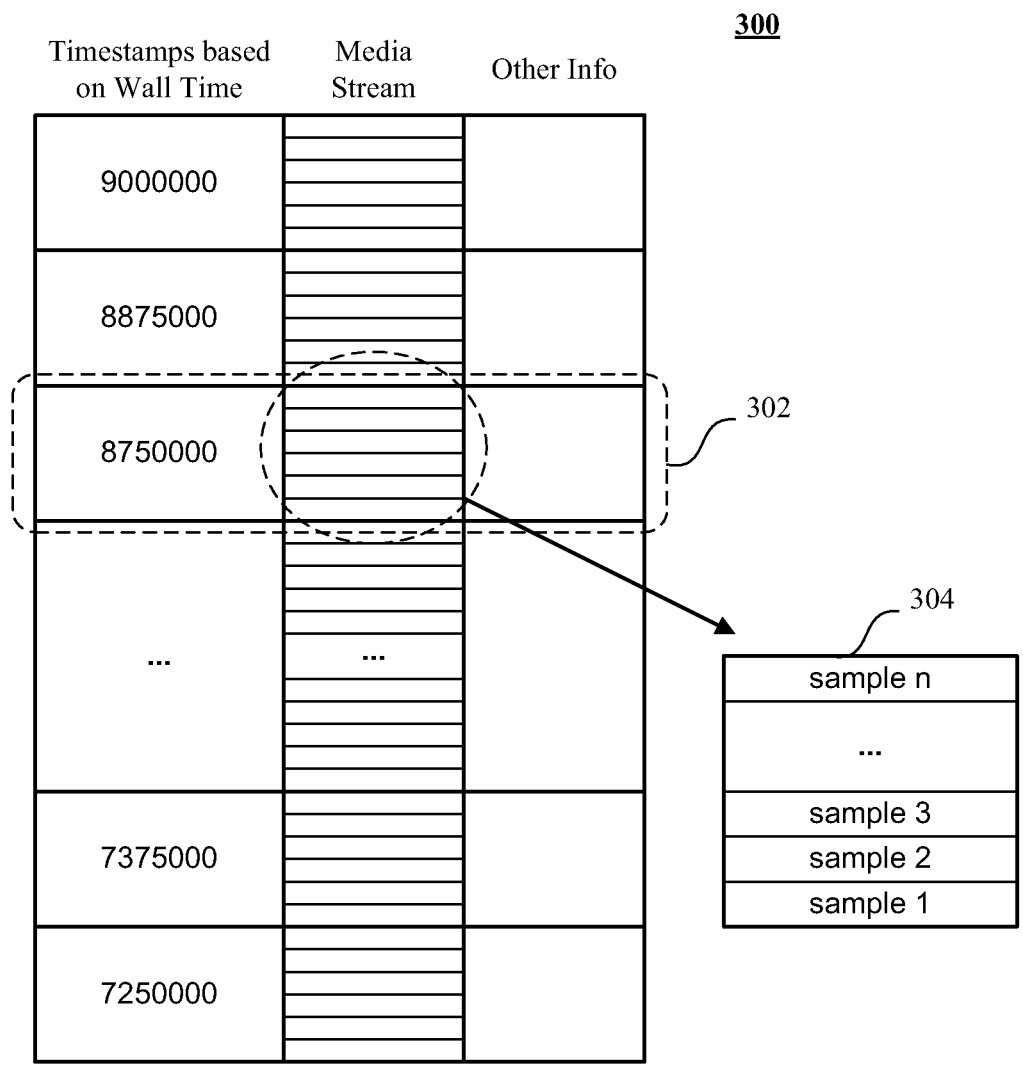
FIG. 3 shows a structure of data packets transmitted from a source device to a sink device in accordance with an embodiment of the invention.

FIG. 3 shows a structure 300 of data packets transmitted from the source device 202 to the first sink device 204 in accordance with an embodiment of the invention. As shown, each data packet 302 has a data portion 304 including a number of samples of the media stream, a timestamp associated with the first wall time 212 for indicating a playout time of the data packet 302, and other information related to the data packet, such as the stream ID, stream data length, etc. Before the encapsulating starts, the processor 214 determines the number of samples of the media stream to be encapsulated in each data packet based on a streaming interval defined by the type of media stream, and a sample rate of the media stream. In a preferred embodiment, the number of samples in each data packet is calculated by multiplying the streaming interval by the sample rate. For example, if the streaming interval is defined as 125,000 ns, and the sample rate of the media stream is 48 KHz, then there are 6 samples in each data packet. In a preferred embodiment, the processor 214 encapsulates the at least one media stream into the plurality of data packets based on IEEE 1722 Layer 2 Transport Protocol. The processor 214 can be a processor of an MCU of the source device 202, or alternatively could be a separate processor within the source device 202. The first I/O interface 216 sends out the plurality of data packets based on the corresponding timestamps and the first wall time 212.

Referring back to FIG. 2, the local media clock generator 224 is connected to the second global clock unit 220 for locking the local media clock 228 to the second global clock 218, so that the first and second global clocks, and the local media clock are synchronized with each other. The player 230 is also connected to the second global clock unit 220, a playout time of samples in each data packet is determined by the timestamps and the second wall time 224. The player 230 can be a processor of an MCU of the first sink device 204, or alternatively could be a separate processor within the first sink device 204. In a preferred embodiment, the player 230 includes a buffer 232 for storing the plurality of data packets received from the source device 202. In another preferred embodiment, the buffer 232 is a unit separate from the player 230. The buffer 232 can be a RAM or part of an internal memory (RAM) of a micro control unit (MCU) of the sink device 202.

Figure 4:
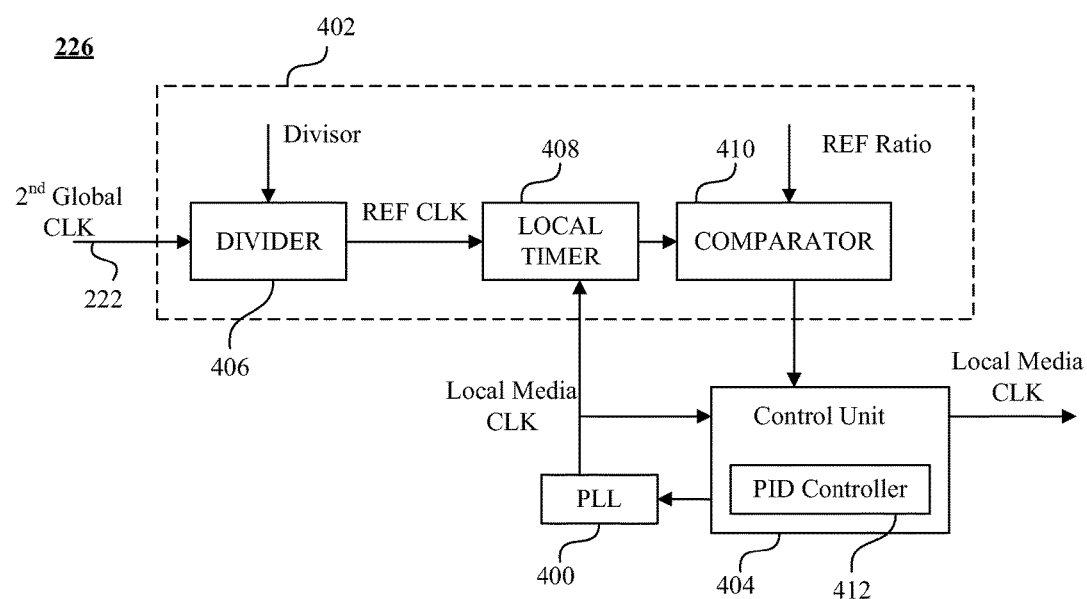
FIG. 4 is a schematic block diagram of a local media clock generator of the sink device in accordance with an embodiment of the invention.

FIG. 4 is a schematic block diagram of the local media clock generator 224 of the first sink device 204 in accordance with an embodiment of the invention. The local media clock generator 226 includes a phase locking loop (PLL) 400 for generating the local media clock. An expected frequency of the local media clock could be set at least based on the sample rate of the at least one media stream, for example, if the sample rate of the media stream is 48 KHz, the expected frequency of the local media clock could be set as n times of 48 KHz, wherein n is a natural number. The local media clock generator 226 further includes a capturing unit 402 connected to the PLL 400 for determining whether the local media clock is locked to the second global clock, and a control unit 404 connected to the PLL 402 and the capturing unit 402 for locking the local media clock to the second global clock 222 and outputting the local media clock if the local media clock is locked to the second global clock 222.

The capturing unit 402 includes a divider 406 for generating a reference clock by dividing the second global clock 222 with a predetermined divisor. For example, if the frequency of the second global clock 222 is 100 MHz, and the divisor is 100K, thus the frequency of the reference clock is 1 KHz. The frequency of the second global clock 222 can be any frequency value as long as hardware can support, e.g., 25 MHz, 50 MHz, 100 MHz or other frequency if needed. The capturing unit 402 further includes a local timer 408 connected to the divider 406 and the PLL 400 for generating a timing result by counting the local media clock within two consecutive rising/falling edges of the reference clock, and a comparator 410 connected to the local timer 408 for determining whether the local media clock is locked to the second global clock 222 by comparing the timing result with a reference ratio, where the reference ratio is determined based on the frequency of the reference clock and the expected frequency of the local media clock. For example, if the frequency of the reference clock is 1 KHz and the expected frequency of the local media clock is 24 MHz, the reference ratio is set as 24000. The comparator 410 generates a difference value between the timing result and the reference ratio.

The control unit 404 determines whether the difference value is within a predetermined acceptable error range, if the difference value is within the predetermined acceptable error range, the local media clock is determined as locked to the second global clock 222. The control unit 404 includes an adjusting controller 412, wherein if the local media clock is locked to the second global clock 222, the control unit 404 outputs the local media clock to the player, otherwise the adjusting controller 412 adjusts the PLL 400 until the local media clock is locked to the second global clock 222, in a preferred embodiment the PLL 400 is adjusted based on a proportional-integral-derivative (PID) algorithm. The control unit 404 can be a processor of an MCU of the first sink device 204, or alternatively could be a separate processor within the first sink device 204.

Figure 5:
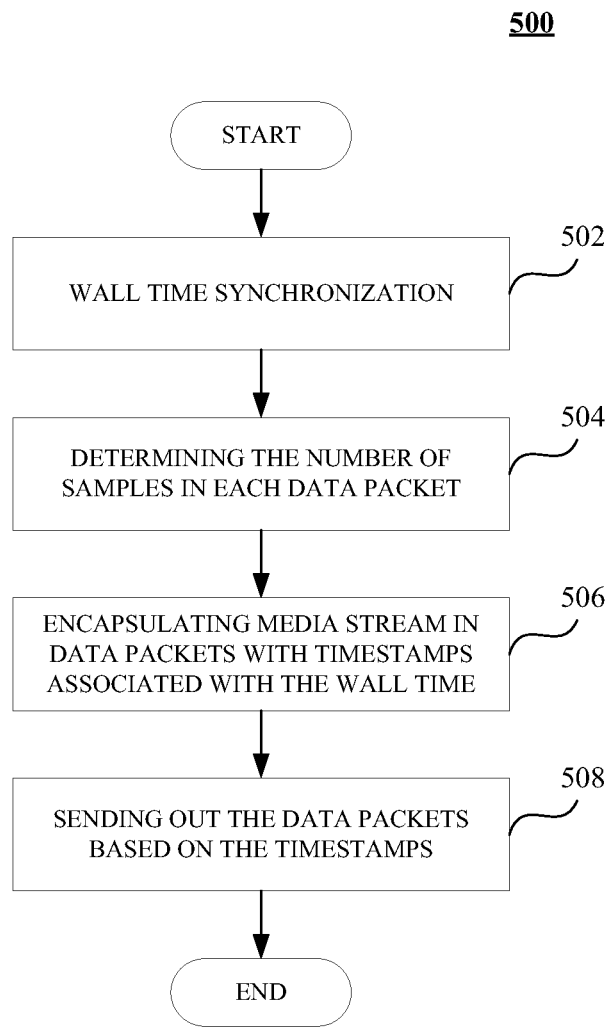
FIG. 5 is a flow chart of operating the source device in accordance with an embodiment of the invention.

FIG. 5 is a flow chart 500 showing a method of operating the source device 202 of the multimedia system 200 to provide at least one media stream to the sink device 204 of the multimedia system 200 in accordance with an embodiment of the invention.

At step 502, a first wall time provided based on a first global clock of the source device 202 is synchronized with a second wall time provided based on a second global clock of the sink device 204 through a network protocol to achieve synchronization between the source device 202 and the sink device 204. In a preferred embodiment, the network protocol is IEEE 1588 Precision Clock Synchronization Protocol or IEEE 802.1AS Timing and Synchronization Protocol.

At step 504, a processor 214 of the source device 202 determines the number of samples of the media stream to be encapsulated in each data packet based on a streaming interval defined by a type of the media stream, and a sample rate of the media stream. In a preferred embodiment, the number of samples in each data packet is calculated by multiplying the streaming interval by the sample rate. For example, if the streaming interval is defined as 125,000 ns, and the sample rate of the media stream is 48 KHz, thus there are 6 samples in each data packet. In a preferred embodiment, the step 504 is not necessary to be performed after the step 502.

At step 506, the processor 214 encapsulates the at least one media stream into a plurality of data packets with corresponding timestamps associated with the first wall time of the source device 202. In a preferred embodiment, the processor 214 encapsulates the at least one media stream into the plurality of data packets based on IEEE 1722 Layer 2 Transport Protocol.

At step 508, the source device 202 sends out the plurality of data packets based on the corresponding timestamps and the first wall time.

Figure 6:
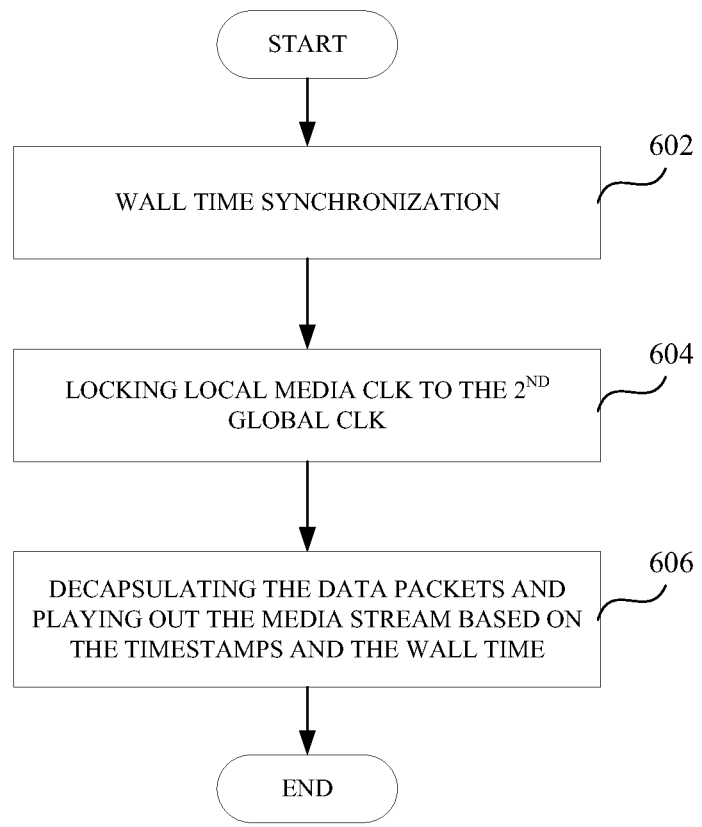
FIG. 6 is a flow chart of operating the sink device in accordance with an embodiment of the invention.

FIG. 6 is a flow chart 600 of operating the sink device 204 of the multimedia system 200 to play out the multimedia streams in accordance with an embodiment of the invention.

At step 602, similar to the step 502 of FIG. 5, the second wall time of the sink device 204 is synchronized with the first wall time of the source device 202 through a network protocol to achieve synchronization between the source device 202 and the sink device 204. In a preferred embodiment, the network protocol is IEEE 1588 Precision Clock Synchronization Protocol or IEEE 802.1AS Timing and Synchronization Protocol.

At step 604, the sink device 204 generates a local media clock for playing out the multimedia stream and locks the local media clock to the second global clock.

Figure 7:
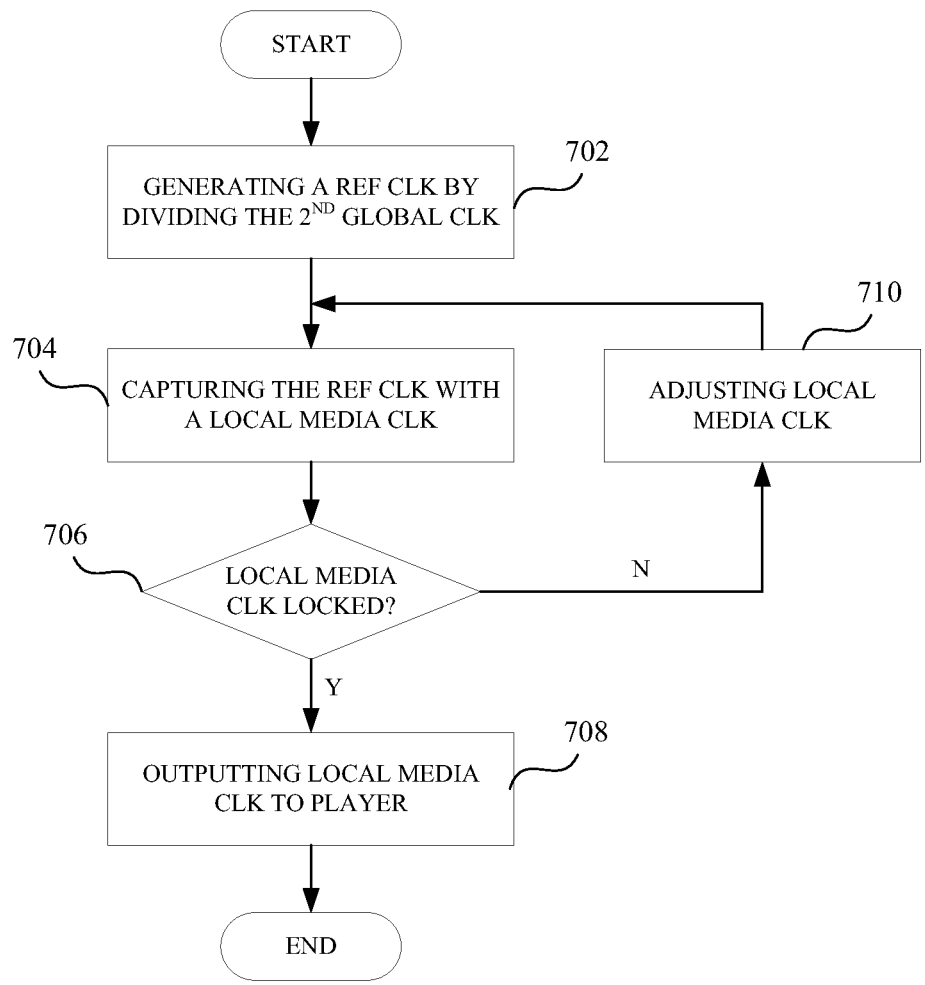
FIG. 7 is a flow chart of locking a local media clock of the sink device to a global clock in accordance with an embodiment of the invention.

FIG. 7 is a detailed flow chart 700 showing the step 604 of FIG. 6 for locking the local media clock of the sink device to the second global clock in accordance with an embodiment of the invention.

At step 702, the sink device 204 generates a reference clock by dividing the second global clock with a predetermined divisor. For example, if the frequency of the second global clock is 100 MHz, and the divisor is 100K, thus the frequency of the reference clock is 1 KHz. The frequency of the second global clock can be any frequency value as long as hardware can support, e.g. 25 MHz, 50 MHz, 100 MHz or other frequency if needed.

At step 704, the sink device 204 captures the reference clock with a local media clock and generates a timing result by counting the local media clock within two consecutive rising/falling edges of the reference clock. In a preferred embodiment, the local media clock is generated by a phase locking loop (PLL). An expected frequency of the local media clock could be predetermined at least based on the sample rate of the media stream, for example, if the sample rate of the media stream is 48 KHz, the expected frequency of the local media clock could be set as n times of 48 KHz, wherein n is a natural number.

At step 706, the sink device 204 determines whether the local media clock is locked to the second global clock by comparing a difference value between the timing result and a predetermined reference ratio with a predetermined acceptable error range. The reference ratio is determined based on the frequency of the reference clock and the expected frequency of the local media clock. For example, if the frequency of the reference clock is 1 KHz and the expected frequency of the local media clock is 24 MHz, the reference ratio is set as 24000. The error range, for example, can be set as a range from −1% to +1%, which is acceptable by the multimedia system 200.

At step 708, if the difference value is within the predetermined acceptable error range, the local media clock is determined as locked to the second global clock and output to a player 230 of the sink device 204.

At step 710, if the difference value is out of the predetermined acceptable error range, the sink device 204 adjusts the PLL until the local media clock is locked to the second global clock. In a preferred embodiment the PLL 400 is adjusted based on a proportional-integral-derivative (PID) algorithm.

Referring back to FIG. 6, at step 606, the player 230 of the sink device 204 decapsulates the plurality of data packets and plays the media stream based on the local media clock that has been locked to the second global clock. A play-out time of each data packet is determined by the timestamps and the second wall time, so that synchronization between the source and sink devices 202 and 204 is achieved.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A multimedia system, comprising:
   at least one source device for providing at least one media stream, wherein the source device comprises:
   a memory for storing the at least one media stream;
   a first global clock unit for providing a first wall time based on the a first global clock;
   a processor connected to the memory and the first global clock unit for encapsulating the at least one media stream into a plurality of data packets with corresponding timestamps associated with the first wall time; and
   a first input/output (I/O) interface connected to the first global clock unit and the processor for sending out the plurality of data packets based on the timestamps and the first wall time; and
   at least one sink device communicating with the at least one source device for playing out the media stream, wherein the sink device comprises:
   a second I/O interface for receiving the plurality of data packets;
   a second global clock unit connected to the second I/O interface for generating a second global clock and providing a second wall time based on the second global clock, wherein the first and second wall time are synchronized with each other through a network protocol;
   a local media clock generator for providing a local media clock that is locked to the second global clock; and
   a player connected to the second I/O interface and the local media clock generator for decapsulating the plurality of data packets, and playing the at least one media stream with the local media clock, wherein a play-out time of each data packet is determined by a corresponding timestamp and the second wall time, wherein the local media clock generator includes:
   a phase locking loop (PLL) for generating the local media clock;
   a capturing unit connected to the PLL for determining whether the local media clock is locked to the second global clock, the capturing unit having a divider for generating a reference clock by dividing the second global clock, a local timer connected to the divider and the PLL for timing the reference clock with the local media clock, and a comparator connected to the local timer for determining whether the local media clock is locked to the second global clock; and
   a control unit connected to the PLL and the capturing unit for locking the local media clock to the second global clock and outputting the local media clock.

2. The multimedia system of claim 1, wherein the first and second global clock units include a master clock unit and a slave clock unit, and the slave clock unit is synchronized to the master clock unit through the network protocol.

3. The multimedia system of claim 2, wherein the network protocol is one of IEEE 1588 Precision Clock Synchronization Protocol and IEEE 802.1AS Timing and Synchronization Protocol.

4. The multimedia system of claim 1, wherein a number of samples of the at least one media stream encapsulated in each data packet is determined based on a streaming interval defined by a type of the media stream and a sample rate of the at least one media stream.

5. The multimedia system of claim 1, wherein the processor encapsulates the at least one media stream into the plurality of data packets based on IEEE 1722 Layer 2 Transport Protocol.

6. The multimedia system of claim 1, wherein the control unit comprises a proportional-integral-derivative (PID) controller, wherein if the local media clock is locked to the second global clock, the control unit outputs the local media clock to the player, otherwise the PLL is adjusted by the PID controller.

7. A method of operating a multimedia system that includes at least one source device for providing at least one media stream, and at least one sink device communicating with the at least one source device for playing out the at least one media stream, the method comprising:
   encapsulating the at least one media stream stored in the at least one source device into a plurality of data packets with corresponding timestamps associated with a first wall time in the at least one source device;
   transmitting the plurality of data packets to the at least one sink device based on the timestamps and the first wall time;
   synchronizing a second wall time provided based on a second global clock in the at least one sink device with the first wall time through a network protocol;
   locking a local media clock in the at least one sink device to the second global clock;
   decapsulating the plurality of data packets received in the at least one sink device; and
   playing out the at least one media stream based on the local media clock that is locked to the second global clock, wherein a playout time of each data packet is determined by a corresponding timestamp and the second wall time,
   wherein the local media clock is generated by a phase locking loop (PLL) and wherein said locking includes:
   generating a reference clock by dividing the second global clock,
   determining whether the local media clock is locked to the second global clock by timing the reference clock with the local media clock, and
   adjusting the PLL until the local media clock is locked to the second global clock.

8. The method of claim 7, wherein the network protocol is one of IEEE 1588 Precision Clock Synchronization Protocol and IEEE 802.1AS Timing and Synchronization Protocol.

9. The method of claim 7, further comprising calculating a number of samples of the at least one media stream to be encapsulated in each data packet based on a streaming interval defined by a type of the media stream, and a sample rate of the at least one media stream.

10. The method of claim 7, wherein said encapsulating is based on IEEE 1722 Layer 2 Transport Protocol.

11. The method of claim 7, wherein said adjusting is based on a proportional-integral-derivative (PID) algorithm.

\* \* \* \* \*